United States Patent [19]

Puhl et al.

[11] Patent Number: 4,629,829
[45] Date of Patent: Dec. 16, 1986

[54] FULL DUPLEX SPEAKERPHONE FOR RADIO AND LANDLINE TELEPHONES

[75] Inventors: Larry C. Puhl, Sleepy Hollow; Richard J. Vilmur, Palatine, both of Ill.

[73] Assignee: Motorola, Inc., Schaumburg, Ill.

[21] Appl. No.: 681,540

[22] Filed: Dec. 14, 1984

[51] Int. Cl.$^4$ ............................................. H04Q 7/04
[52] U.S. Cl. ..................................... 379/58; 379/390; 379/411
[58] Field of Search .............. 179/2 EA, 100 L, 81 B, 179/170.2, 2 E, 2 EB; 381/110

[56] References Cited

U.S. PATENT DOCUMENTS

| | | | |
|---|---|---|---|
| 3,500,000 | 3/1970 | Kelly, Jr. et al. | 179/170.2 |
| 3,508,017 | 4/1970 | Unrue, Jr. | 179/170.2 |
| 3,647,992 | 3/1972 | Thomas | 179/170.2 |
| 3,962,553 | 6/1976 | Linder et al. | 179/81 A |
| 4,225,754 | 9/1980 | Bernard et al. | 179/81 B |
| 4,268,727 | 5/1981 | Agrawal et al. | 179/170.2 |
| 4,377,858 | 3/1983 | Treiber | 370/24 |
| 4,378,468 | 3/1983 | Braun | 179/1 CN |
| 4,378,603 | 3/1983 | Eastmond | 455/79 |
| 4,400,584 | 8/1983 | Vilmur | 179/1 HF |
| 4,405,840 | 9/1983 | Zebo | 179/170.2 |
| 4,425,483 | 1/1984 | Lee et al. | 179/170.2 |
| 4,453,039 | 6/1984 | Ferrieu | 179/81 B |
| 4,454,384 | 6/1984 | Ferrieu et al. | 179/81 B |
| 4,479,036 | 10/1984 | Yamamoto et al. | 179/170.2 |
| 4,480,156 | 10/1984 | Takahashi et al. | 179/170.2 |
| 4,481,385 | 11/1984 | Kalfs | 179/170.2 |
| 4,513,177 | 8/1985 | Nishino et al. | 179/81 B |

OTHER PUBLICATIONS

Busala, "Fundamental Considerations in the Design of a Voice-Switched Speakerphone", Bell System Technical Journal, vol. 39, No. 2, Mar. 1960, pp. 265-294.
Widrow, "Adaptive Filters I: Fundamentals", Standard Electronics Laboratories, Stanford University Technical Report No. 6764-6, Dec. 1966, pp. III-iv, 1-6, 49-56.
South, Hoppit, and Lewis, "Adaptive Filters to Improve Loudspeaker Telephone", Electronic Letters, vol. 15, No. 21, Oct. 11, 1979, pp. 673-674.

Primary Examiner—Robert G. Lev
Attorney, Agent, or Firm—Rolland R. Hackbart; Raymond A. Jenski

[57] ABSTRACT

A full duplex speakerphone employing adaptive filters and having application in radiotelephone systems is disclosed. To cancel acoustic feedback echo of the receive signal, a representation of the receive signal is subtracted from the transmit signal generated by the speakerphone microphone. The adaptive filter receive signal representation coefficents are modified when the receive signal is detected. Likewise, to cancel electronic echo of the transmit signal, a representation of the transmit signal is subtracted from the receive signal. The adaptive filter transmit signal representation coefficients are modified when the transmit signal is detected.

24 Claims, 7 Drawing Figures

FULL DUPLEX SPEAKERPHONE FOR RADIO AND LANDLINE TELEPHONES

RELATED PATENT APPLICATIONS

The present application is related to U.S. Pat. No. 4,378,603, "Radio Telephone with Hands-free Operation" by Bruce C. Eastmond issued on Mar. 29, 1983 and to U.S. Pat. No. 4,400,584, "Speakerphone for Radio and Landline Telephones", by Richard J. Vilmur issued on Aug. 23, 1983. These patents are assigned to the assignee of the present invention, and, by reference thereto, the foregoing related patents are incorporated in their entirety into the present application.

BACKGROUND OF THE INVENTION

The present invention relates generally to speakerphones, and more particularly to an improved duplex speakerphone that can advantageously be utilized in both radio and landline telephone systems.

In both radio and landline telephone systems, a user typically communicates by means of a handset that includes a speaker at one end which is placed close to the user's ear and a microphone at the other end which is held close to the user's mouth. In operation one hand of the user must be used to hold the telephone handset in its proper orientation thereby leaving the user's only free hand to accomplish tasks, such as driving a vehicle. In order to provide a greater degree of freedom for the user, speakerphones have been developed for use in landline telephone systems.

A conventional speakerphone is typically coupled to the telephone line and, when enabled, allows the user to move about freely while communicating with another telephone user. Such speakerphones generally either receive or transmit at a given instant, i.e. simplex, and a comparison of the volume of the two parties is made. This comparison selects the party speaking the loudest and determines the mode-receive or transmit. If this selection did not occur, a feedback, or echo, may disrupt the communications and, if severe enough, cause an oscillation in the telephone circuit known as "singing".

One type of echo commonly found in telephony is that of an electrical signal reflection due to imperfect impedance match at four-wire to two-wire conversion points commonly called hybrids. Thus, part of a near end party's speech signals are coupled from his speakerphone microphone circuit to his speaker circuit. A long delay introduced into this coupled portion of speech may cause confusion to the speaker and disruption of communications. The second form of echo unique to speakerphones is that of acoustic coupling between the speaker and the microphone. Acoustic energy produced by the speaker may reflect from nearby objects or be coupled directly to the microphone. This feedback produces a phase delay in the coupled audio signal making a hollow sounding echo and, with sufficient audio signal amplification gain, singing in the telephone circuit.

The conventional solution to echo and singing problems for speakerphones is the attenuation of the audio signal in the path having the weakest audio signal in favor of the path having the strongest audio signal. Many techniques have been developed to switch or variably attenuate one path or the other. These techniques, however, suffer from a number of problems including inability to accomodate high ambient noise environments, clipping of speech syllables of the party attempting to start a conversation on the attenuated path, and path attenuation uncertainty due to feedback from the speaker to the microphone when the speaker amplification has been turned up. These problems have been reduced by inventions (U.S. Pat. No. 4,378,603 by Eastmond and U.S. Pat. No. 4,400,584 by Vilmur) having unique speech detector circuits and special control processes.

For true duplex systems, self-adapting echo cancellers have recently been employed to mitigate echos by generating an estimate of the echo and subtracting the estimate from the signal corrupted by the echo. In this way, the acoustic coupling of a far end telephone talker can be removed from the signal generated by the near end speakerphone microphone without decreasing or switching the gain available to the near end speakerphone user. In a similar manner, electronic reflections from the hybrid may be cancelled at the near end speakerphone.

The determination of the echo estimate, however, may not always be calculated properly. Under conditions of high ambient noise, non-linear distortion, or both parties talking simultaneously, the echo sample may not be fully representative of the echo signal. Therefore, there is a need for full duplex speakerphone which can provide optimum performance under less than ideal situations of noise, echo signal distortion, and simultaneous user speech.

SUMMARY OF THE INVENTION

Accordingly, it is a general object of the present invention to provide a speakerphone that allows duplex hands-free communications in environments having high levels of ambient noise.

It is another object of the present invention to provide a duplex speakerphone having echo cancellation of echo signals subject to non-linear distortion.

It is a further object of the present invention to enable duplex speakerphone operation without telephone circuit singing under conditions of simultaneous user speech.

These and other objects are achieved in the present invention which includes duplex speakerphone circuitry for providing cancellation of undesired echo between a received signal and a generated transmit signal. A portion of the received signal is subtracted from the generated transmit signal, which includes an echo of the received signal, thereby resulting in a cancellation of the received signal echo. Likewise a portion of the transmit signal is subtracted from the received signal, which includes an echo of the transmit signal, thereby cancelling the transmit signal echo. The portion of the received signal is derived after detection of the received signal and following cancellation of the transmit signal echo. Also, the portion of the transmit signal is derived after detection of the transmit signal and following cancellation of the received signal echo.

DETAILED DESCRIPTION OF THE PREFERRED EMBODIMENT

Figure 1:
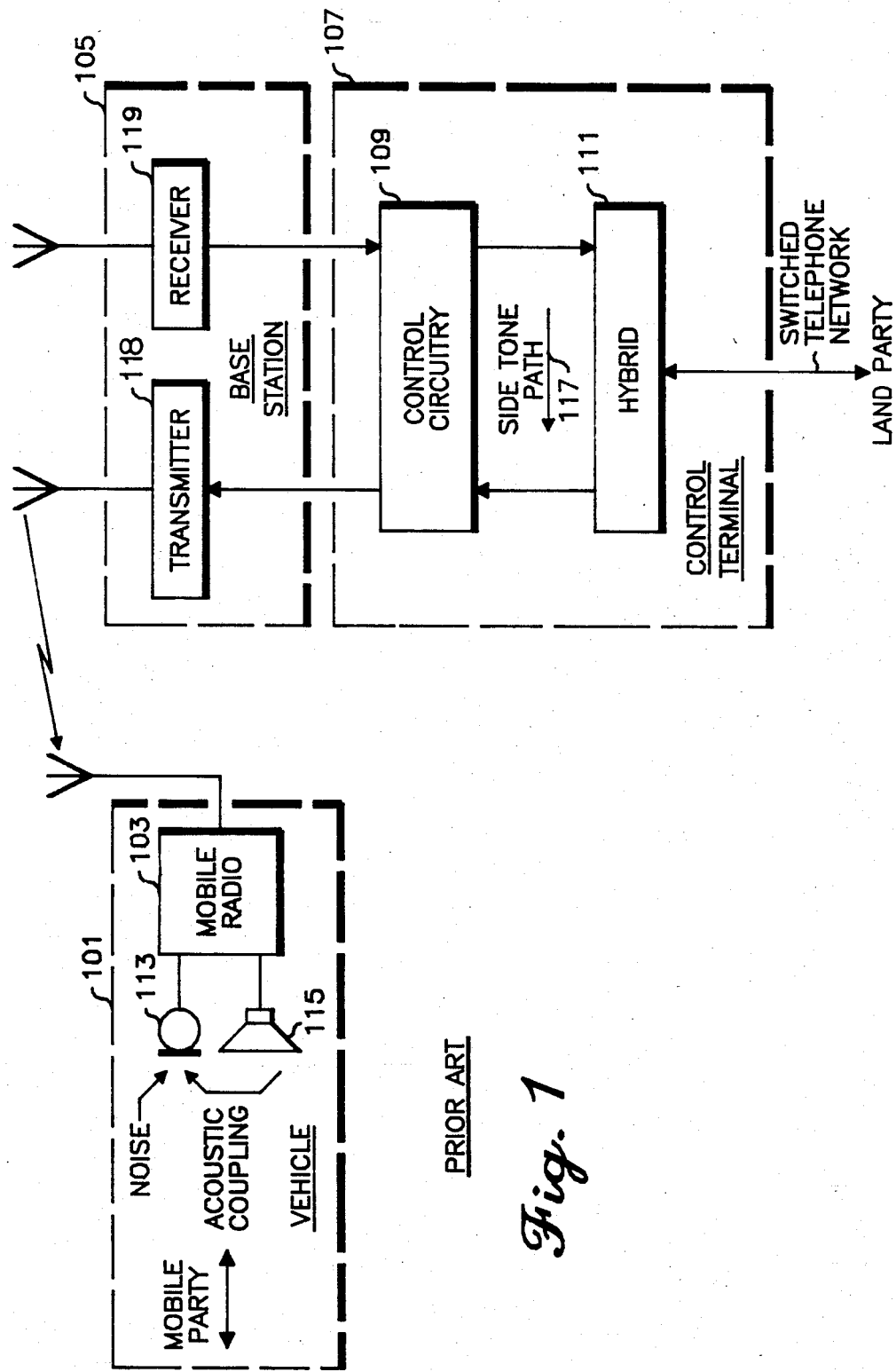
FIG. 1 is a block diagram of a mobile radio speakerphone and radio system known from prior art.

A basic mobile radiotelephone system which may advantageously utilize the hands-free speakerphone of the present invention is shown in FIG. 1. In conventional and cellular radiotelephone systems, a party in a vehicle 101 communicates by way of a mobile radio 103 with a radio base station 105 may be connected to a land party via a radio system control terminal 107 and the public switched telephone network. Among other things, the radio system control terminal 107 includes control circuitry 109 which provides a communications path from the radio base station 105 to a four-wire to two-wire converter, or hybrid, 111 for conversion to the conventional two-wire pair used in land telephony.

In order to provide the mobile party with the same quality of telephone service that a land party receives, it is necessary that each radio channel of the radiotelephone system be a duplex radio channel, having separate transmit and receive radio frequencies. Thus, the mobile radio 103 may be simultaneously transmitting on one frequency and receiving on the other, such that both the mobile and land parties may simultaneously talk and listen. Typically a handset, similar to handsets found in landline telephone instruments, is connected to the mobile radio 103. It is necessary that the mobile party hold the handset up to his ear just as a land party does. It would be much safer and convenient for the mobile party, however, if the conversation during a telephone call could be achieved without the necessity of a continuous physical involvement of the mobile party. By utilizing a speakerphone the mobile party can converse with the land party for the duration of the telephone call with no required physical action, thus freeing the mobile party of tasks which would interfere with the safe operation of the vehicle. Moreover, some states have motor vehicle regulations requiring that a mobile party stop the vehicle when dialing another party's number. As a result many radiotelephone control and dialing units provide for on-hook automatic dialing of telephone numbers. However, the handset must still be removed by the mobile party for conversation. By utilizing the present invention, vehicular safety is enhanced further since the speakerphone allows the mobile party to converse without the necessity of removing one of his hands from the steering wheel.

In landline applications, the speakerphone of the present invention can likewise be used to allow freedom of movement during conversations and multi-party conference calls. The speaker phone can be coupled to a telephone line via a hybrid interface which may couple a near end transmit signal to the telephone line and couple a receive far end signal from the telephone line to the speakerphone.

In order to provide for hands-free operation in vehicular applications, a separate microphone 113 and separate speaker 115 can be provided for voice communications. It is advantageous to utilize a separate microphone 113 in a vehicle in order to optimally locate the microphone 113 for receiving the hands-free party's speech in a changing and noisy environment.

At least two sources of feedback operate in a speakerphone. The first type of feedback is reflection of the hands-free party's signal by the four-wire to two-wire conversion hybrid 111. This is illustrated as the sidetone path 117 reflected from the impedance mismatch between the hybrid 111 of the control terminal 107 and the switched telephone network. An additional reflection may occur at the far end land party's hybrid (not shown) and be delayed by a period of time proportional to the electrical distance of the land party from the control terminal 107.

The second type of feedback is that of acoustic coupling between the speakerphone speaker 115 and the speakerphone microphone 113. This acoustic coupling may be the result of reflections of the acoustic energy emitted by speaker 115 from surfaces in the spacial regions near the speaker 115 to the microphone 113. The acoustic coupling may also be direct coupling of acoustic energy from the speaker 115 to the microphone 113. The effect of the acoustic coupling is a hollow echo presented to the land party and, if the amplification gain of the loop (from hybrid 111 to transmitter 118, mobile radio 103, speaker 115, microphone 113, mobile radio 103, receiver 119, and hybrid 111) is great enough, oscillation (singing) will result making any conversation impossible.

Figure 2:
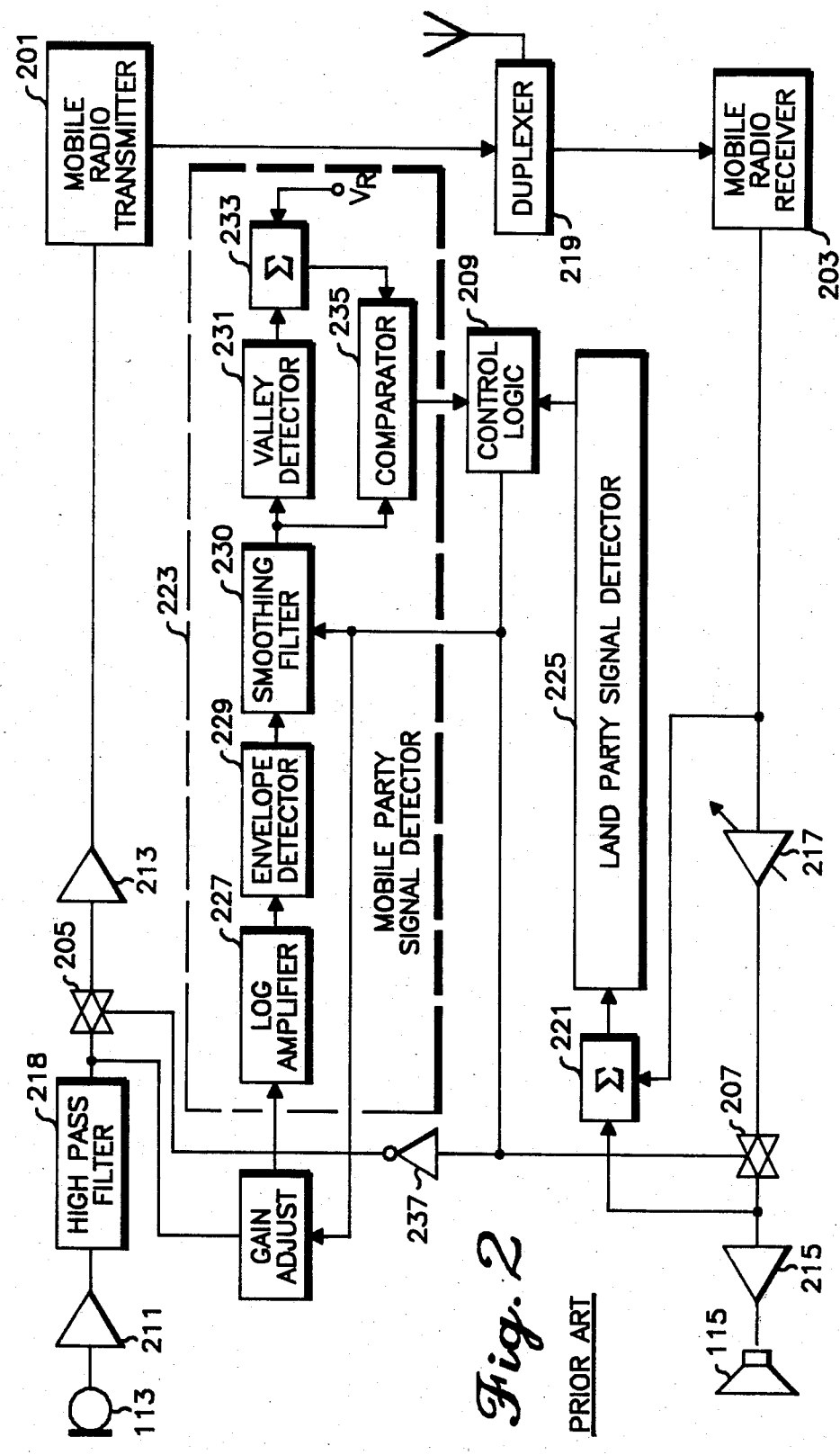
FIG. 2 is a block diagram of a gain path switching hands-free speakerphone employing signal detectors to determine the active speakerphone path.

Referring to FIG. 2, there is illustrated a block diagram of hands-free speakerphone control circuitry which has been used for mobile radiotelephone service. Such a speakerphone has been described in U.S. Pat. No. 4,378,603, "Radiotelephone With Hands-Free Operation" by Bruce C. Eastmond, issued Mar. 29, 1983 and U.S. Pat. No. 4,400,584, "Speakerphone For Radio And Landline Telephones" by Richard J. Vilmur issued Aug. 23, 1983. Both of these patents are assigned to the assignee of the present invention. The control circuitry of FIG. 2 may be located either in the mobile radio equipment 103 or in a separate equipment box utilized by conventional radiotelephones for interfacing control and other functions with the mobile radio 103.

The hands-free control circuitry interfaces microphone 113 and speaker 115 (which deal with the low frequency or baseband frequency of the radio link) to mobile radio transmitter 201 and mobile radio receiver 203, respectively. Two audio switches 205 and 207 are included which open to block or close to pass the audio signals from the microphone 113 or to the speaker 115 in response to a control signal from control logic 209. Thus, in this conventional speakerphone, only one path is closed at any given time by switches 205 and 207 and only one side of the conversation passes through the speakerphone. Each of the audio paths also includes gain stages 211 and 213 in the microphone audio path and gain stages 215 and 217 in the speaker audio path. Amplifier 217 in the speaker audio path may have a variable gain for controlling the volume of speaker 115. Additionally, a high pass filter 218 may be interposed between the microphone 113 and switch 205 to remove low frequency background noise. In a preferred embodiment, a high pass filter having a cut-off frequency of approximately 300 Hz effectively removes the low frequency background noise.

The audio signals in the microphone audio path are coupled from amplifier 213 to radio transmitter 201, which in turn provides a radio signal for transmission to the base station 105 via duplexer 219. Radio signals received from base station 105 are selectively coupled by duplexer 219 to radio receiver 203, which demodulates audio signals from the radio signal for application to amplifier 217 and summer 221.

The hands-free control circuitry in FIG. 2 also includes a mobile party signal detector 223 and a land party signal detector 225 for detecting the presence of the mobile party voice signals and land party voice signals, respectively. The mobile party and land party signal detectors 223 and 225, include substantially identical circuit blocks. Both detectors 223 and 225 are comprised of conventional circuitry including a logarithmic amplifier 227 (commonly referred to as a "soft" limiter), an envelope detector 229, a smoothing filter 230, a "valley" detector 231, a summer 233, and a comparator 235. The logarithmic amplifier 227 extends the dynamic range of the envelope detector 229 due to its amplification characteristic. The envelope detector 229 provides an output which follows the maxima and minima, or envelope, of the audio signals. The smoothing filter 230 provides variable bandwidth low-pass filtering depending upon the binary state of the control logic 209 output. The valley detector 231 operates as a rectifier which follows the minima of the envelope detector 229 output. The valley detector 231 output essentially corresponds to the steady state background noise present at the microphone 113 in the case of detector 223 or at the receiver 203 in the case of detector 225. Summer 233 adds a reference voltage ($V_R$) to the valley detector 231 output. This offset voltage $V_R$ is chosen together with the response characteristics of the envelope detector 229 and smoothing filter 230 such that the generation of spurious comparator output signals due to the background noise encountered in vehicles is avoided.

Thus, the comparator 235 will only provide an output signal if the smoothing filter 230 output exceeds the steady state background noise by the magnitude of the reference voltage $V_R$. The output signal from comparator 235 has a binary one high level when the envelope detector 229 output exceeds the valley detector 231 output by the reference $V_R$ and otherwise provides a binary zero level to control logic 209. The one level from comparator 235 indicates that audio signals from microphone 113 have been detected in the case of detector 223 and that audio signals from receiver 203 have been detected in the case of detector 225.

Summer 221 applies a signal that is the sum of both the audio signals from mobile radio receiver 203 and the variable audio signals from audio switch 207 to land party signal detector 225. Thus, the signal applied by summer 221 to detector 225 varies as the volume of speaker 115 is varied.

The control logic 209 in FIG. 2 is responsive to the output signals from the mobile and land party signal detectors 223 and 225. The control logic 209 provides a control signal for opening and closing audio switch 207 and audio switch 205 via inverting gate 237. When audio switch 207 is opened, audio switch 205 is closed and vice versa.

The hands-free speakerphone of FIG. 2, therefore, solves the echo problem by path switching, that is, determining whether the speakerphone is to be transmitting audio signals picked up by microphone 113 or receiving signals from mobile radio receiver 203 by providing gain in one direction and attenuation in the other. A variable gain or path-switched technique such as that used in FIG. 2 is subject to a condition in which the initial speech syllable from the path not switched is clipped before the signal detector detects and activates the switch. Additionally, background noise of sufficient amplitude in either direction can cause blockage of a desired signal and cause confusion in the telephone conversation.

Figure 3:
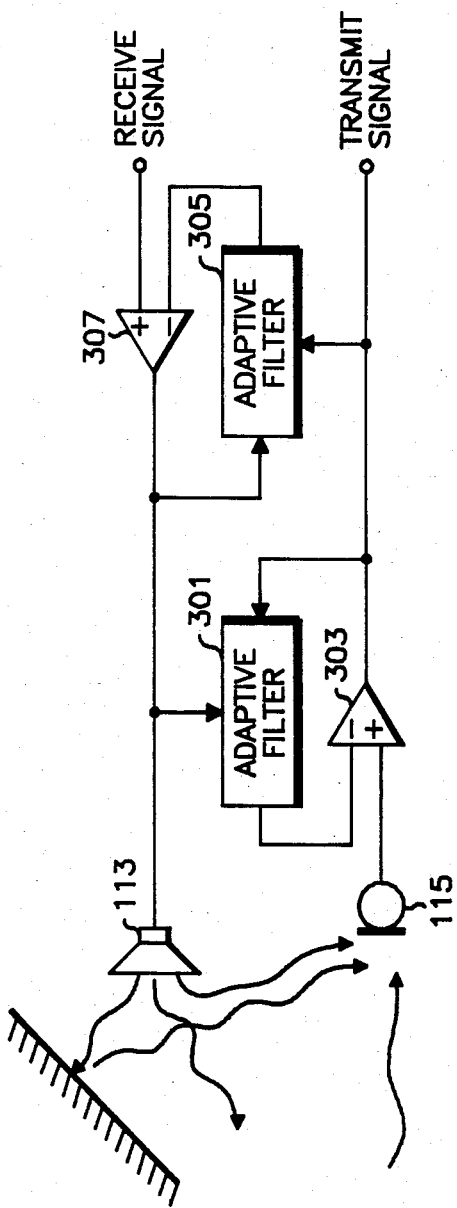
FIG. 3 is a block diagram of a known speakerphone employing adaptive filters to remove echos caused by acoustic coupling and hybrid mismatch.

FIG. 3 shows a block diagram of a full duplex speakerphone. A receive signal is conventionally converted to acoustic energy by speaker 113 and acoustic energy is converted to a transmit signal by microphone 115. Both the receive signal and the transmit signal may be present simultaneously and the acoustic echoes, direct or reflected, are cancelled from the transmit signal by adaptive filter 301 and associated subtraction network 303. The hybrid echo is similarly cancelled from the receive signal by adaptive filter 305 and associated subtraction network 307.

The adaptive filter 301 synthesizes the linear transfer function of the receive signal acoustic echo path. The input signal is taken from the receive signal input to the speaker 113. The output of adaptive filter 301 is a representation of the receive signal via the acoustic echo path, and is coupled to the subtraction circuit 303 to cancel the actual receive signal echo. An error signal from the output of subtraction circuit 303 is coupled back to the adaptive filter 301 to produce a convergence of the weighting and filter coefficients used by adaptive filter 301 to an optimum representation. Adaptive filter 301 is a conventional nonstationery linear adaptive filter which will be described later.

The adaptive filter 305 synthesizes the transfer function of the electrical echo path. Its input is connected to the transmit signal following subtraction circuit 303. Based on the transmit signal input, adaptive filter 305 supplies a signal representative of the echoed transmit signal to subtraction circuitry 307. Subtraction circuit 307 essentially cancels any transmit signal which is coupled to the received signal by a mismatched hybrid. An error signal is coupled from the output of subtraction circuit 307 to adaptive filter 305 to produce convergence of the weighting and filter coefficients used by adaptive filter 305.

Thus, the adaptive filter 301 linearly synthesizes the acoustic echo signal which is correlated to the receive signal and the adaptive filter 305 linearly synthesizes the electric echo signal which is correlated to the transmit signal. A problem arises if the transfer function of the echo signal is other than a linear function. For example, electrical to acoustical transducers such as speaker 113, typically have transfer functions that are non-linear. The sound produced by a speaker contains distortion. If this distortion is not accounted for in the coefficients of adaptive filter 301, the distortion is not cancelled from the transmit signal and an echo consisting of the distortion is returned to the far-end party.

Figure 4:
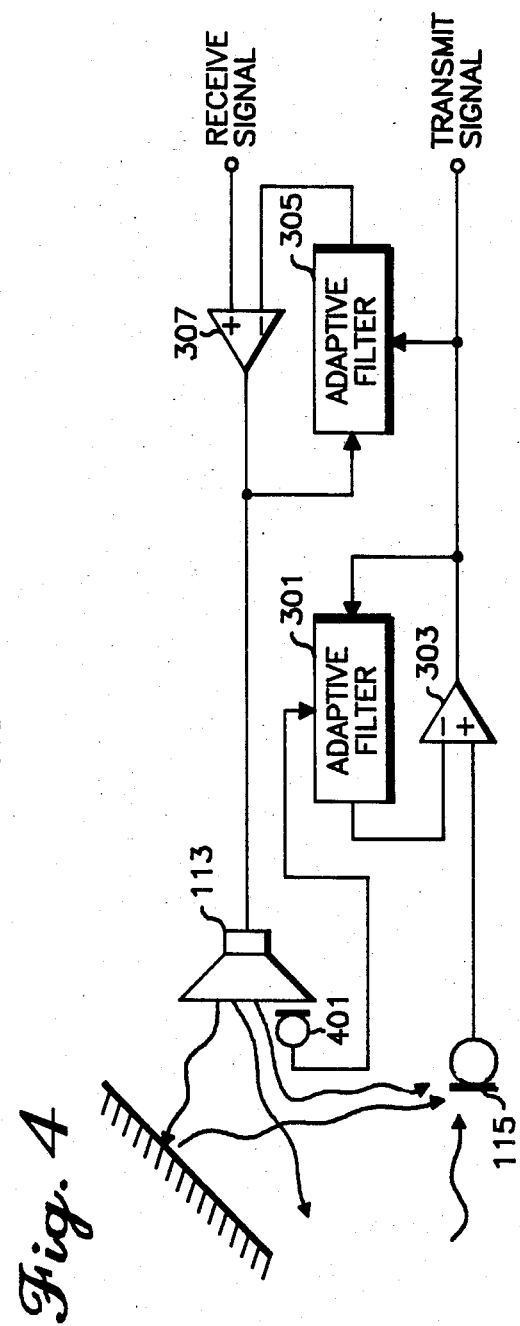
FIG. 4 is a block diagram of a speakerphone in which the coefficients for the adaptive filter are determined by a second microphone positioned such that the acoustic output of the speaker and its associated distortion are transformed into an electronic signal by the second microphone.

To aid in cancelling the non-linear products generated in the electrical to acoustic transducer, the configuration of FIG. 4 has been developed. In this improvement of a speakerphone, a second microphone 401 is added to sample the acoustic energy generated by speaker 113. This microphone 401 may be optimally positioned between $\frac{1}{4}''$ and 6'' from the speaker. The microphone 401 sample includes the transduction non-linearities and is input to adaptive filter 301. Because the signal input to filter 301 more accurately simulates the echo signal input to microphone 115, a better echo cancellation is achieved at subtraction circuit 303.

Figure 5:
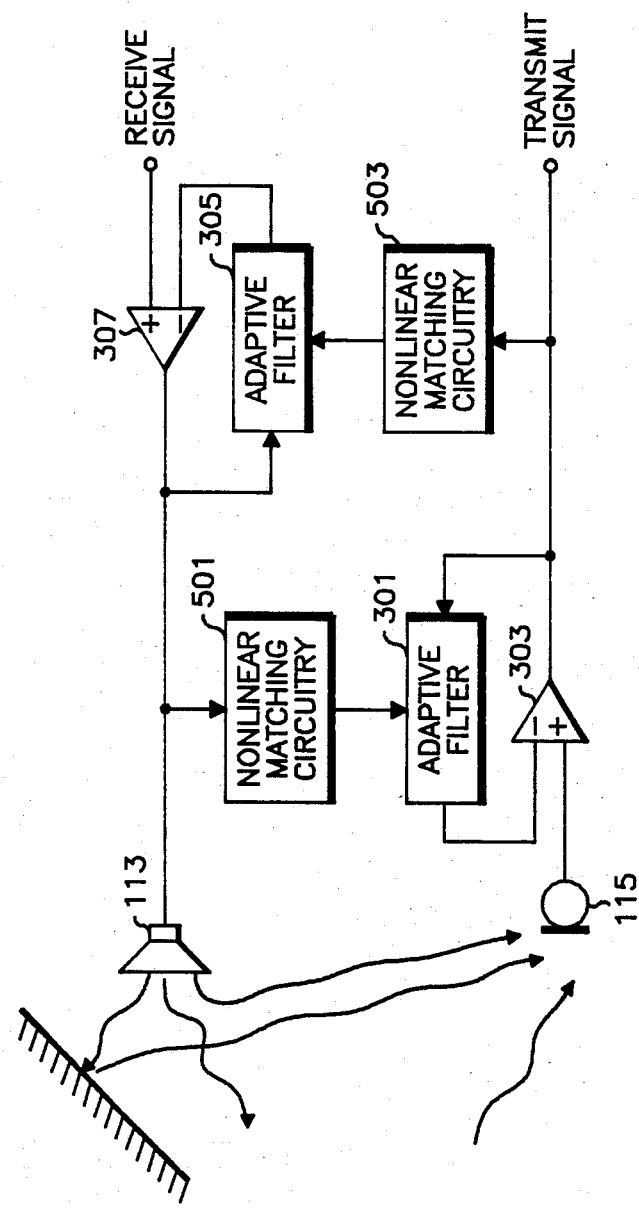
FIG. 5 is a block diagram of a speakerphone employing non-linear matching circuitry to shape the signal input to the adaptive filter such that the coefficients developed therefrom include predetermined distortion expected from the speaker. Also, non-linear matching circuitry may shape the input to the adaptive filter to account for distortion in the channel between the speakerphone and the matching hybrid.

Some non-linearities may be predicted and a physical implementation of the predicted non-linearity may be created. A non-linearity matching circuitry equivalent to the speaker 113 transfer function non-linearity may be used to sample the incoming received signal as shown in FIG. 5. The physical implementation of the nonlinearity matching circuitry may vary depending upon the type of distortion encountered. The simplest implementation used in a preferred embodiment is a series impedance followed by a voltage variable resistor or varistor. As the actual implementation may be a designer's choice, the invention should not be limited to a particular selection of components. The non-linear matching circuitry 501 is coupled to the adaptive filter 301 such that the signal used to create the adaptive filter coefficients is processed to include the predicted non-linearities of speaker 113. Thus, if the non-linearities can be predicted and an implementation realized, the sampling microphone 401 can be replaced by circuitry 501.

Similarly, non-linearities introduced into the electronic echo of the transmit signal may be simulated by a non-linear matching circuitry 503. Thus non-linearities such as those introduced in the radio system by signal compression, amplitude limiting, and expansion may be factored from the receive signal by adaptive filter 305 and subtraction circuit 307.

It has been shown by others that allowing the adaptive filter to update the echo coefficients during intervals when the desired signal is corrupted by noise or when the signal energy is concentrated in frequency or skewed, such as when single or multi-frequency tones are present, the adaptive filter assumes a transfer function which represents the energy skewed signal. These coefficients may not be optimum for the remaining frequency components of the signal to be cancelled. Consequently, a poor return loss path may be established at frequencies which are not cancelled by the adaptive filter. This poor return loss can lead to undesirable oscillations in the circuit.

Figure 6:
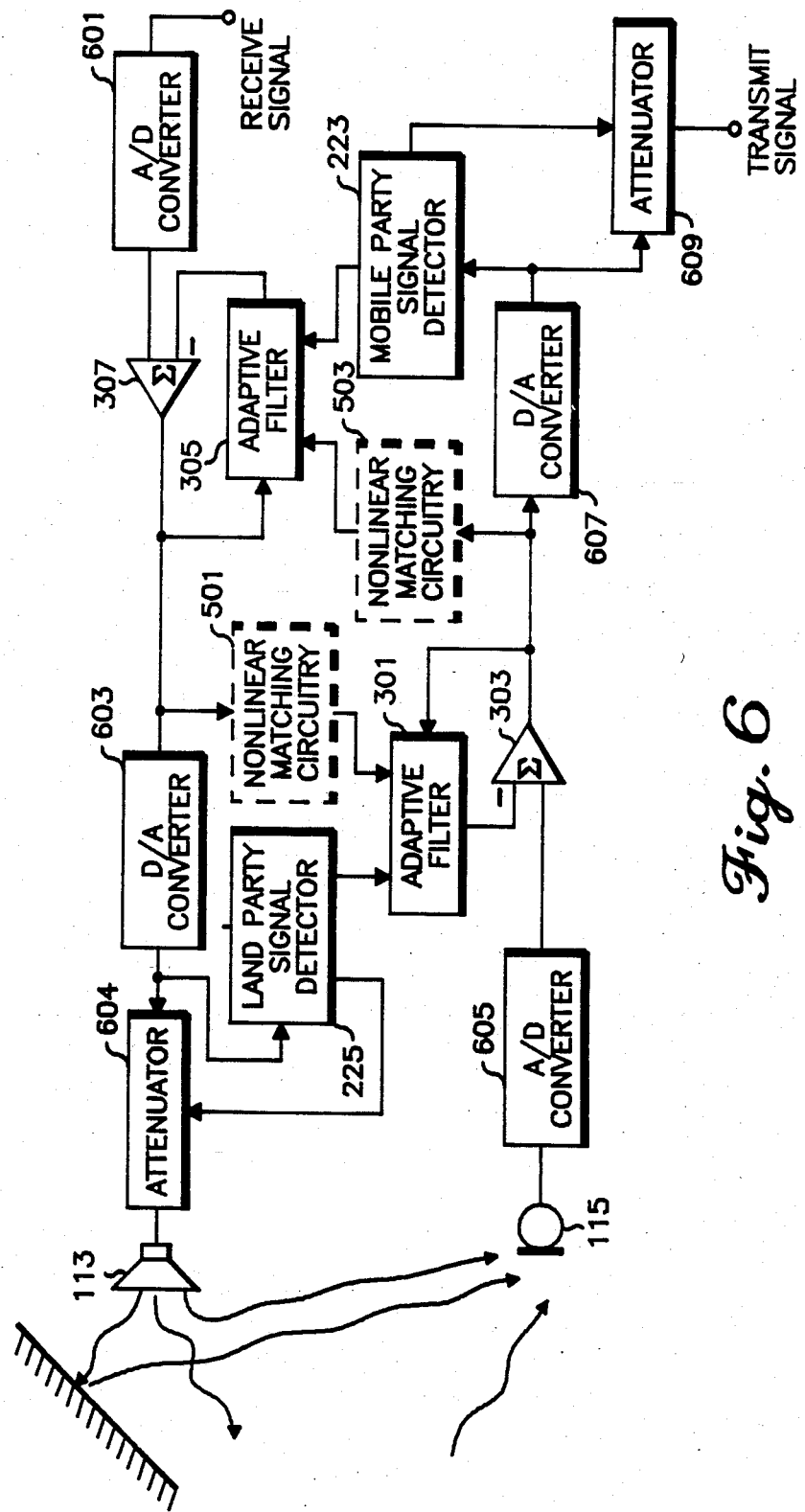
FIG. 6 is a block diagram of the present invention in which a land party signal detector enables the coefficient calculation of an adaptive filter for cancelling the acoustic echo present from speaker to microphone and a mobile party signal detector enables the coefficient calculation of the receive signal adaptive filter for cancelling the hybrid echo. Non-linear matching circuitry may shape the coefficient input signal to the adaptive filters.

To resolve this problem, the signal detectors described in conjunction with FIG. 2 may be employed to gate the determination of coefficients by the adaptive filter. One such arrangement is shown in FIG. 6. In this embodiment, the analog signal is converted to a digital representation of the analog signal so that processing and cancellation of echoes may be simplified. A receive signal from a mobile receiver or the receive terminals of a four-wire to two-wire hybrid are digitized by conventional analog to digital converter 601. The digitized receive signal is then coupled to subtraction circuit 307 which removes the near party echo from the received signal. Thence it is coupled to conventional digital to analog converter 603 and passed to speaker 113 via attenuator 604 and any necessary power amplification (not shown). Analog to digital converter 601 and digital to analog converter 603 may be realized with an integrated circuit, MC14402 available from Motorola, Inc. and including both functions. The land party signal detector 225 determines that the received signal is a signal which may be used to develop appropriate coefficients for the adaptive filter 301. The output of the signal detector 225 is a binary detection signal developed by comparing the instantaneous energy level to the background energy level plus a threshold value. The background energy level is developed by filtering the instantaneous energy level. The filter in the preferred signal detector embodiment is a "valley" detector comprising an asymmetrical FIR filter with a slow rise time, which may be on the order of 2 seconds, and a fast fall time, which may be approximately 50 msec. The valley detector tracks the background energy by slowly rising while speech or other information is present and then quickly falling back to the ambient noise level when the information ends. By comparing the valley detector output to the instantaneous engergy, an indication is presented to the associated adaptive filter 301 to be used to enable and disable the updating and modification of the adaptive filter coefficients. Although the land party signal detector 225 is shown and described as an analog detector, this detector may be digitally implemented and would sample the received signal prior to digital to analog convertor 603.

The digitized receive signal is input to adaptive filter 301 via optional non-linear matching circuitry 501. This portion of the receive signal is used by the adaptive filter 301 to calculate filter coefficients representative of the received signal so that the received signal echo may be subtracted from the transmit signal. The process used by the adaptive filter 301 will be described later.

The transmit signal may be generated by voice or other signal generating means and, in a speakerphone, contains elements of the received signal acoustically coupled from speaker 113 to microphone 115. This composite transmit signal is converted to a digital transmit signal by conventional analog to digital converter 605 (which may be an MC14402) before being passed to the subtraction circuit 303. The coefficients computed for the receive signal determine what fraction of the composite transmit signal will be cancelled. Thus, the output from subtraction circuit 303 consists of the near end generated signal and portions of the receive signal echo not removed by the subtraction circuitry 303. Part of this transmit signal is fed back to the adaptive filter 301 to modify weighting factors applied to the receive signal coefficients so that the amount of echoed received signal removed is optimized. Thus the feedback signal provides a dynamic correction to the amount and frequency of the signal to be subtracted from the transmit signal.

A portion of the transmit signal is passed to adaptive filter 305 through optional non-linear matching circuitry 503 so that a similar cancellation process of the echoed transmit signal may be removed from the received signal. A mobile party signal detector 223 is employed to detect the transmit signal in the presence of noise and activate the coefficient determination of adaptive filter 305. The input to mobile party signal detector 223 may follow a transmit signal digital to analog converter 607 (which may be an MC14402) or, if the mobile party signal detector 223 is implemented in digital form, may precede the conventional digital to analog converter 607.

It will be recognized by those skilled in the art that if the duplex speakerphone is realized by digital signal processing, all of the digital functions of FIG. 6 may be implemented as part of a signal processing microcomputer and appropriate processing methods. Furthermore, it is possible to combine functions shown as discrete functions in FIG. 6 into a single time-shared function. One example of such sharing might be the time-shared use of a single signal detector to accomplish the functions of both land party signal detector 225 and mobile party signal detector 223. Additionally, the non-linear matching circuitry 501 may be gain determining entries in a look-up table chosen to match the speaker 113 distortion. Likewise the non-linear matching circuitry 503 may be entries to match the radio system distortion.

An attenuator 609 follows the digital to analog converter 607. This attenuator 609 and receive path attenuator 604 are small value switched attenuators and may, in the preferred embodiment, provide as little as 0 db attenuation to the respective signal. In the preferred embodiment these attenuators are variable gain amplifiers but may also be multiplication constants in a digital implementation and the invention need not be so limited. The primary function of the attenuators is to keep the system unconditionally stable since the adaptive filters eliminate most of the system echoes. Typically, when one path alone has a signal, the attenuator in that path is switched out and the attenuator in the opposite path is switched in. This selection of attenuators is maintained when speech ceases. This process is known as switch and stay. When both paths carry a signal, both attenuators are switched in. These low value switchable attenuators in cooperation with the signal detectors permit simultaneous speech signals to occur without detrimental effects.

Figure 7:
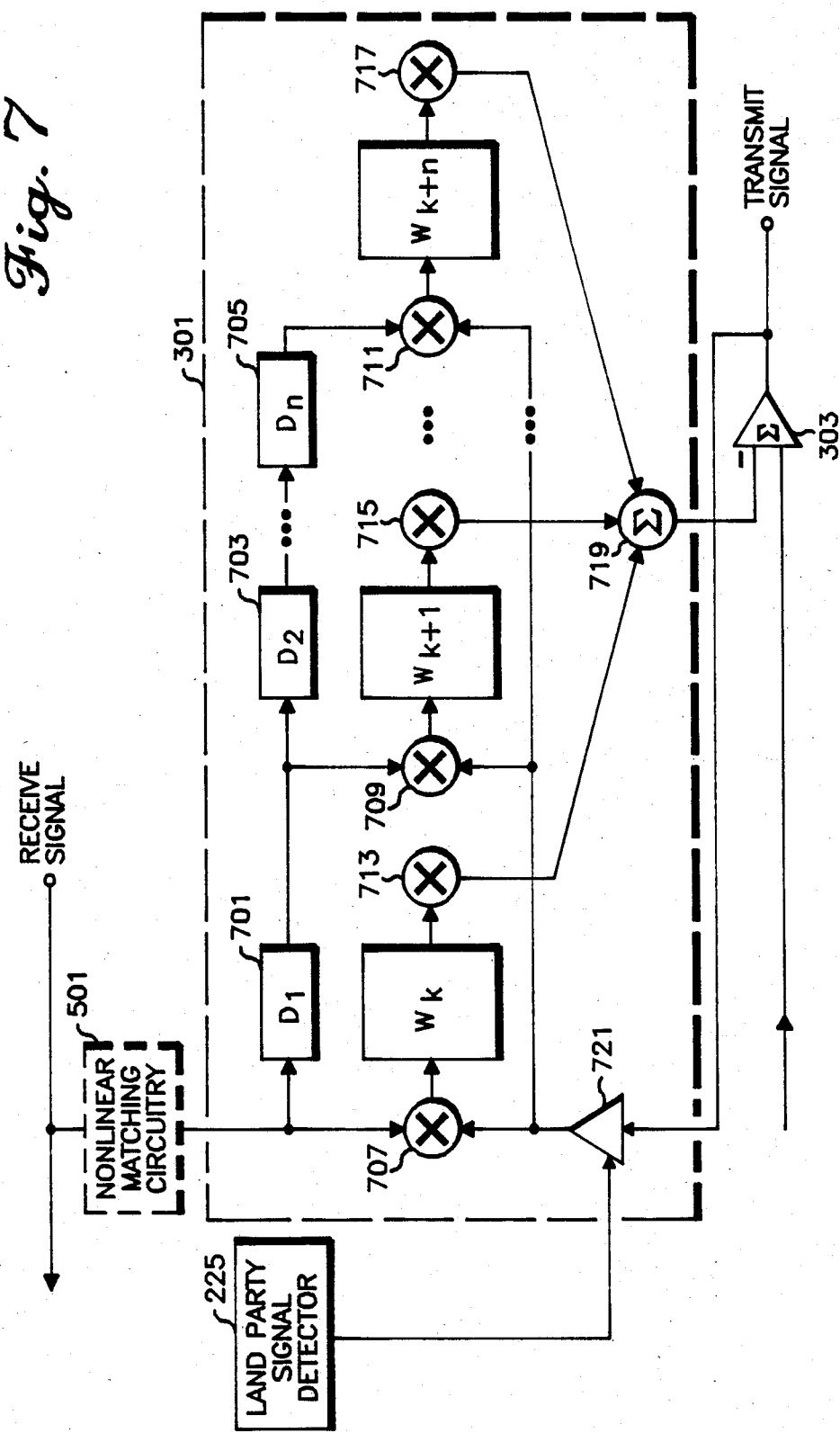
FIG. 7 is a block diagram of an adaptive filter which may be used in the present invention.

FIG. 7 is a block diagram of adaptive filter 301 which may be used to cancel the receive signal echo from the transmit signal. A virtually identical adaptive filter 305 is used to cancel the transmit signal echo from the receive signal. The receive signal may be input to the adaptive filter 301 via non-linear matching circuitry 501 if such circuitry is desirable. The receive signal is presented to a series of delay elements shown as signal delay blocks 701, 703 and 705. Each delay element of the filter imparts a 125 microsecond delay to the receive signal in the preferred embodiment so that time delayed replicas of the original digitized receive signal are available at the output of each delay element. The signals produced at the outputs of each of the delay elements are adjusted by multiplying the delayed receive signals by a feedback signal in multipliers 707, 709 and 711; factored by a predetermined weighting factor at 713, 715, and 717; and combined in summing network 719. This signal which is the algebraic negative of the receive signal echo is supplied to the subtraction network 303 to cancel the receive signal echo present on the transmit signal. Since the receive signal may be speech characterized by erratic signal levels and silent intervals, means for adjusting the adaptive filter is present via the feedback signal and amplifier 721. The gain of amplifier 721 proportionally establishes the speed of correction by providing a signal to be multiplied with the receive signal at its delay components to produce a signal whose polarity and magnitude indicate the appropriate correction for each delayed element of the received signal. Thus, if the error signal feedback to the adaptive filter 301 indicates a substantial remnant of the echo in the outgoing transmit signal, the amount of each delayed received signal is individually adjusted to allow a greater portion of the received signal to be passed to the subtraction network 303. Inhibition of the calculation of coefficients may be accomplished by causing amplifier 721 to cease passing error corrections to the weighting factors.

Thus for a radiotelephone it is desirable to be able to communicate without having to use a hand held telephone handset. This is a basic safety improvement on simultaneously operating a vehicle and communicating by radio. It is also desirable to be able to communicate in a full duplex mode thus avoiding audio path switching which can, at times, cause confusion and blocking by attempted simultaneous talking. The present invention provides the means to carry on a normal conversation and a radio communication system by the use of adaptive digital filters to cancel both the speaker to microphone coupling in the vehicle and whatever echo comes from the hybrid and the remainder of the communications system. Therefore, while a particular embodiment of the invention has been described and shown, it should be understood that the invention is not limited thereto since many modifications may be made by those skilled in the art. It is therefore contemplated to cover by the present application any and all such modifications that fall within the true spirit and scope of the basic underlying principles disclosed and claimed herein.

We claim:

1. Hands-free telephone circuitry for providing cancellation of undesired signal coupling, including a speaker transducing a modified first signal produced from a first signal received from a communications channel and a microphone transducing a second signal for modification and transmissing as a modified second signal on a communication channel simultaneous with the first signal, comprising:
    means for detecting the modified first signal;
    a first adaptive filter having coefficient determining means enabled by said modified first signal detecting means;
    means including said first adaptive filter for substracting at least a portion of the modified first signal from the second signal, thereby producing the modified second signal with coupling from the modified first signal essentially cancelled;
    means for detecting the modified second signal;
    a second adaptive filter having coefficient determining means enabled by said modified second signal detecting means; and
    means including said second adaptive filter for substracting at least a portion of the modified second signal from the first signal, thereby producing the modified first signal with coupling from the modified second signal essentially cancelled.

2. Hands-free telephone circuitry in accordance with claim 1 further comprising level reducing means for the modified first signal and level reducing means for the modified second signal, respectively coupled to said modified first signal detector and said modified second signal detector such that both level reducing means are activated when the modified first signal and the modified second signal are simultaneously detected.

3. Hands-free telephone circuitry in accordance with claim 1 further comprising means, coupled to said modified first signal subtracting means, for compensating said portion of modified first signal for non-linearities introduced into the modified first signal by the speaker.

4. Hands-free telephone circuitry in accordance with claim 1 further comprising means, coupled to said modified second signal subtracting means, for compensating said portion of modified second signal for non-linearities introduced into the modified second signal by the communications channel.

5. Hands-free telephone circuitry in accordance with claim 1 wherein said means for detecting the modified first signal further comprises:
   means for detecting and filtering the envelope of the modified first signal;
   means for dynamically detecting the minima of the modified first signal; and
   means for comparing the detected and filtered envelope to the detected minima and generating a first signal detect output signal when the modified first signal envelope exceeds the minima by a predetermined amount.

6. Hands-free telephone circuitry in accordance with claim 1 wherein said means for detecting the modified second signal further comprises:
   means for detecting and filtering the envelope of the modified second signal;
   means for dynamically detecting the minima of the modified second signal; and
   means for comparing the detected and filtered envelope to the detected minima and generating a second signal detect output signal when the modified second signal envelope exceeds its minima by a predetermined amount.

7. Hands-free telephone circuitry in accordance with claim 1 wherein the communications channel is a duplex radio channel having two radio frequencies.

8. Hands-free telephone circuitry in accordance with claim 1 wherein the communications channel is a two-wire telephone line.

9. Hands-free radiotelephone circuitry for providing cancellation of undesired baseband signal coupling, including a receiver for receiving a first signal, a speaker for transducing a modified first signal, a microphone for transducing a second signal, and a transmitter for transmitting a modified second signal simultaneous with receiver reception, comprising:
   means for detecting the modified first signal;
   means for creating a representation of the modified first signal when the modified first signal is detected;
   means for subtracting said representation of the modified first signal from the second signal, thereby producing the modified second signal with coupling from the modified first signal essentially cancelled;
   means for increasing the level of the modified first signal transduced by the speaker when the modified first signal is detected;
   means for detecting the modified second signal;
   means for creating a representation of the modified second signal when the modified second signal is detected;
   means for subtracting said representation of the modified second signal from the first signal, thereby producing the modified first signal with coupling from the modified second signal essentially cancelled; and
   means for increasing the level of the modified second signal transmitted by the transmitter when the modified second signal is detected.

10. Hands-free radiotelephone circuitry in accordance with claim 9 further comprising means, coupled to said modified first signal representation creating means, for compensation of said modified first signal representation for non-linearities introduced into the modified first signal by the speaker.

11. Hands-free radiotelephone circuitry in accordance with claim 9 further comprising means, coupled to said modified second signal representation creating means, for compensation of said modified second signal representation for non-linearities introduced into the modified second signal by the transmitter and associated radio network.

12. Hands-free radiotelephone circuitry in accordance with claim 9 wherein said means for detecting the modified first signal further comprises:
   means for detecting and filtering the envelope of the modified first signal;
   means for dynamically detecting the minima of the modified first signal; and
   means for comparing the detected and filtered envelope to the detected minima and generating a first signal detect output signal when the modified first signal envelope exceeds the minima by a predetermined amount.

13. Hands-free radiotelephone circuitry in accordance with claim 9 wherein said means for detecting the modified second signal further comprises:
   means for detecting and filtering the envelope of the modified second signal;
   means for dynamically detecting the minima of the modified second signal; and
   means for comparing the detected and filtered envelope to the detected minima and generating a second signal detect output signal when the modified second signal envelope exceeds the minima by a predetermined amount.

14. A method for providing cancellation of undesired signal coupling in a hands-free telephone having a speaker, which transduces a modified first signal produced from a first signal received from a communications channel, and a microphone, which transduces a second signal for modification and transmission as a modified second signal on a communications channel simultaneous with the first signal, comprising the steps of:
   detecting the modified first signal;
   enabling coefficient determining means of a first adaptive filter in response to said detection of the modified first signal;
   subtracting at least a portion of the modified first signal from the second signal, thereby producing the modified second signal with coupling from the modified first signal essentially cancelled;
   detecting the modified second signal;
   enabling coefficient determining means of a second adaptive filter in response to said detection of the modified second signal; and
   subtracting at least a portion of the modified second signal from the first signal, thereby producing the modified first signal with coupling from the modified second signal essentially cancelled.

15. A method in accordance with the method of claim 14 further comprising the step of reducing the level of both the modified first signal and the modified second signal when the modified first signal and the modified second signal are simultaneously detected.

16. A method in accordance with the method of claim 14 further comprising the step of compensating said portion of modified first signal for non-linearities introduced into the modified first signal by the speaker.

17. A method in accordance with the method of claim 14 further comprising the step of compensating said portion of modified second signal for non-linearities introduced into the modified second signal by the communications channel.

18. A method in accordance with the method of claim 14 wherein the step of detecting the modified first signal further comprises the steps of:
 detecting and filtering the envelope of the modified first signal;
 dynamically detecting the minima of the modified first signal;
 comparing the detected and filtered envelope to the detected minima; and
 generating a detect signal when the modified first signal envelope exceeds the minima by a predetermined amount.

19. A method in accordance with the method of claim 14 wherein the step of detecting the modified second signal further comprises the steps of:
 detecting and filtering the envelope of the modified second signal;
 dynamically detecting the minima of the modified second signal;
 comparing the detected and filtered envelope to the detected minima; and
 generating a detect signal when the modified second signal envelope exceeds the minima by a predetermined amount.

20. A method for providing cancellation of undesired baseband signal coupling in a hands-free radiotelephone which includes a receiver for receiving a first signal, a speaker for transducing a modified first signal, a microphone for transducing a second signal, and a transmitter for transmitting a modified second signal simultaneous with receiver reception, comprising the steps of:
 detecting the modified first signal;
 creating a representation of the modified first signal when the modified first signal is detected;
 subtracting said representation of the modified first signal from the second signal, thereby producing the modified second signal with coupling from the modified first signal essentially cancelled;
 increasing the level of the modified first signal transduced by the speaker when the modified first signal is detected;
 detecting the modified second signal;
 creating a representation of the modified second signal when the modified second signal is detected;
 subtracting said representation of the modified second signal from the first signal, thereby producing the modified first signal with coupling from the modified second signal essentially cancelled; and
 increasing the level of the modified second signal transmitted by the transmitter when the modified second signal is detected.

21. A method in accordance with the method of claim 20 further comprising the step of compensating said modified first signal representation for non-linearities introduced into the modified first signal by the speaker.

22. A method in accordance with the method of claim 20 further comprising the step of compensating said modified second signal representation for non-linearities introduced into the modified second signal by the transmitter and associated radio network.

23. A method in accordance with the method of claim 20 wherein said step of detecting the modified first signal further comprises the steps of:
 detecting and filtering the envelope of the modified first signal;
 dynamically detecting the minima of the modified first signal; and
 comparing the detected and filtered envelope to the detected minima and generating a first signal detect output signal when the modified first signal envelope exceeds the minima by a predetermined amount.

24. A method in accordance with the method of claim 20 wherein said step of detecting the modified second signal further comprises the steps of:
 detecting and filtering the envelope of the modified second signal;
 dynamically detecting the minima of the modified second signal; and
 comparing the detected and filtered envelope to the detected minima and generating a second signal detect output signal when the modified second signal envelope exceeds the minima by a predetermined amount.

* * * * *